United States Patent
Kim

(10) Patent No.: US 7,056,592 B2
(45) Date of Patent: Jun. 6, 2006

(54) PROPYLENE HOMOPOLYMERS FOR BIAXIALLY ORIENTED FILMS

(76) Inventor: Sehyun Kim, 4119 Windsor Ct., Murrysville, PA (US) 15668

(*) Notice: Subject to any disclaimer, the term of this patent is extended or adjusted under 35 U.S.C. 154(b) by 226 days.

(21) Appl. No.: 10/716,828

(22) Filed: Nov. 19, 2003

(65) Prior Publication Data

US 2005/0107502 A1 May 19, 2005

(51) Int. Cl.
*B32B 27/00* (2006.01)
*C08L 1/00* (2006.01)

(52) U.S. Cl. ............... 428/500; 428/910; 524/115; 524/379; 526/352

(58) Field of Classification Search ............ None
See application file for complete search history.

(56) References Cited

U.S. PATENT DOCUMENTS

| | | | |
|---|---|---|---|
| 4,603,174 A | 7/1986 | Okada et al. | 525/240 |
| 4,705,828 A | 11/1987 | Matsumoto et al. | 525/232 |
| 5,556,920 A | 9/1996 | Tanaka et al. | 525/216 |
| 6,090,903 A | 7/2000 | Kataoka et al. | 526/351 |
| 6,201,079 B1 | 3/2001 | Streeky et al. | 526/124.8 |
| 6,337,377 B1 | 1/2002 | Ebara et al. | 526/124.6 |
| 6,770,355 B1 | 8/2004 | Minami et al. | 428/220 |
| 2003/0130443 A1 | 7/2003 | Suhm et al. | 526/65 |
| 2004/0171782 A1 | 9/2004 | Lin et al. | 526/351 |

FOREIGN PATENT DOCUMENTS

DE 197 27 065 A1 2/1998
EP 0 747 430 B1 6/1996

OTHER PUBLICATIONS

A.D. Jenkins (UK), "Stereochemical Definitions and Notations Relating to Polymers (1980)," Reprinted from Pure Appl. Chem 53, 733-752 (1981); pp. 25-46.

*Primary Examiner*—Monique R. Jackson
(74) *Attorney, Agent, or Firm*—Robert A. Koons, Jr.; Matthew P. McWilliams; Drinker Biddle & Reath LLP

(57) ABSTRACT

Propylene homopolymers useful in the manufacture of biaxially oriented films are provided. More particularly, the propylene homopolymers of the present invention are useful as core material for a multilayer biaxially oriented film. The propylene homopolymers of the present invention attain these properties by control of the average meso sequence length, $N_m$, in the xylene insoluble phase of the polymer concurrently with control of the quantity of xylene solubles in the polymer as a whole. The propylene homopolymers according to the current invention comprise from about 97 to about 91 percent by weight of a xylene insoluble fraction, and from about 9 to about 3 percent by weight of a xylene soluble fraction. The xylene insoluble fraction has a meso run length of less than or equal to 130. Further, the ratio, r, of the meso run length of the xylene insoluble fraction to the percent content of the xylene soluble fraction in the propylene homopolymers is 22 or less, as determined by the equation:

$$N_m / \% \ XS = r$$

where: $N_m$=average meso sequence length of the xylene insoluble fraction; and
% XS=the percent content of xylene solubles in the propylene homopolymer.

9 Claims, No Drawings

PROPYLENE HOMOPOLYMERS FOR BIAXIALLY ORIENTED FILMS

FIELD OF THE INVENTION

The present invention relates generally to the field of polymer resins for producing biaxially oriented polypropylene (BOPP) films. More particularly, the present invention relates to propylene homopolymers that are useful as core materials in multilayer BOPP films.

BACKGROUND OF THE INVENTION

A BOPP film in general is constructed to have 3–5 layers depending upon its application. Generally, a BOPP film grade material requires specific characteristics to provide good processability and film properties because of the complexity of its converting process. Each layer requires specific characteristics and the core layer is the most important for the processability of the material on a tenter line. The material for the core layer is generally a 2–4 MFR homopolymer having relatively large amounts of atactic polymer, i.e., xylene solubles, and/or low isotacticity of xylene insoluble fraction. Low isotacticity of the xylene insoluble fraction is desirable only to a point, as extremely low isotacticity values will compromise the strength of the web in stretching. These characteristics are not easily obtained and depend on the catalyst system employed for the production of the polypropylene.

Failure to obtain the proper characteristics in the core material may result in various processing problems, including but not limited to, web breakage during orientation of the cast sheets, inconsistent film thickness and a narrow range of processing temperatures.

Different manufacturers have various theories about which properties in a propylene polymer are important in determining processability and film properties for core material. Some manufacturers claim that the stretchability of the film depends linearly on the amount and "quality" of stereoblock. Other manufacturers consider the amount of meso-racemic (mr) triad in the polymer to be critical.

U.S. Pat. No. 6,201,079, to Streeky, et al. discloses that for optimal fabrication performance in oriented films, a propylene polymer resin should have a specific combination of extractables and soluble components at a specific tacticity, as measured by the percent meso pentad (mmmm) determined by $^{13}C$ NMR, to produce a broad processing window. According to the disclosure of U.S. Pat. No. 6,201,079 the general goal is to lower the isotacticity of the total polymer, measured as % mmmm, for a given content of decalin solubles in the resin.

A study was performed focusing on obtaining a better understanding of the structure-processing-properties relationships in BOPP films. It is known that the polypropylene should have at least a certain amount of atactic polypropylene, i.e., xylene solubles, to have good processability. However, the amount xylene solubles alone does not guarantee the processability of a polypropylene. Through this study it was determined that by balancing two characteristics of a propylene homopolymer, namely the quantity of xylene solubles and the average meso sequence length, $N_m$, of the xylene insoluble fraction, consistent processability of propylene homopolymer as a core material in BOPP film manufacture can be obtained.

SUMMARY OF THE INVENTION

The present invention provides propylene homopolymers useful in preparing oriented films, particularly biaxially oriented polypropylene (BOPP) films. The propylene homopolymers of the present invention display good processability at low temperatures and a wide processing window. The propylene homopolymers of the present invention are particularly useful as a core material in multilayer biaxially oriented films.

The propylene homopolymers of the present invention attain these properties by control of the average meso sequence length, $N_m$, in the xylene insoluble fraction of the polymer concurrently with control of the quantity of xylene solubles in the polymer as a whole. The propylene homopolymers according to the current invention comprise from about 97 to about 91 percent by weight of a xylene insoluble fraction, preferably from about 96 to about 93 percent by weight, and from about 9 to about 3 percent by weight of a xylene soluble fraction, preferably from about 7 to about 4 percent.

The xylene insoluble fraction has a meso sequence length of less than or equal to 130. Further, the ratio, r, of the meso sequence length percent content of the xylene soluble fraction in the propylene homopolymers is 22 or less, as determined by the equation:

$$N_m / \% \, XS = r$$

where: $N_m$=average meso sequence length of the xylene insoluble fraction; and

% XS=the percent content of xylene solubles in the propylene homopolymer.

The present invention further provides a biaxially oriented film produced from the above propylene homopolymers, preferably a multilayer biaxially oriented film having a core layer produced from the inventive propylene homopolymers. The present invention further provides a method for providing propylene homopolymers having improved processability at low temperatures and a wide processing window in the production of BOPP films.

DETAILED DESCRIPTION OF THE INVENTION

The present invention provides propylene homopolymers useful in preparing biaxially oriented polypropylene (BOPP) films. The propylene homopolymers of the present invention display good processability at low temperatures and a wide processing window. The propylene homopolymers of the present invention are particularly useful as a core material in a multilayer biaxially oriented film.

Although it is conventional to refer to propylene polymers that contain a small fraction of another α-olefin as homopolymers, the propylene homopolymers according to the current invention are substantially free of significant concentrations of other co-monomers. Preferably, the propylene homopolymers according to the current invention are 100% propylene.

The propylene homopolymers of the present invention attain these properties by control of the meso sequence length in the xylene insoluble fraction of the polymer concurrently with the quantity of xylene solubles in the polymer. The propylene homopolymers according to the current invention comprise from about 97 to about 91 percent by weight of a xylene insoluble fraction, preferably from about 96 to about 93 percent by weight, and from about 9 to about 3 percent by weight of a xylene soluble fraction, preferably from about 7 to about 4 percent. The xylene soluble and insoluble fractions as defined herein are determined using the method defined in ASTM 5492-94. The propylene homopolymers according to the current invention preferably have a melt flow rate of from about 2 to about 4 dg/min.

The xylene insoluble fraction has an average meso sequence length of less than or equal to about 130. The average meso sequence (run) length, $N_m$, is defined by P(m)/P(mr), where P(m), or % m, is the probability of dyad meso sequence and P(mr) is the probability of triad mr (meso-racemic) sequence. P(m) is the sum of P(mm) and ½P(mr+rm), where P(mm) is the probability of a triad mm (meso-meso) sequence and P(mr+rm) is the sum of the probabilities of an mr sequence and an rm (racemic-meso) sequence. These values are obtained via $^{13}C$ NMR using methods that are known in the art. In theory, the longer the meso sequence length, the higher the crystallizability of the material.

Further, the ratio, r, of the meso sequence length of the xylene insoluble fraction to the percent content of the xylene soluble fraction in the propylene homopolymers is about 22 or less, as determined by the equation:

$$N_m / \% \, XS = r$$

where: $N_m$=average meso sequence length of the xylene insoluble fraction; and

% XS=the percent content of xylene solubles in the propylene homopolymer.

As stated previously, both low isotacticity of the xylene insoluble fraction and high xylene solubles in the polymer as a whole are desirable properties in core material for multi-layer BOPP films. However, obtaining these properties independently does not guarantee good performance on a tenter line. Further, certain measures of isotacticity, such as percent meso pentad, may not accurately reflect the processability of the material. It has been determined that obtaining a balance of isotacticity of the xylene insolubles, as measured by $N_m$, and the quantity of xylene solubles provides core material for BOPP films possessing good processing qualities on a tenter line.

Therefore the propylene homopolymers according to the current invention can be used to produce BOPP films, providing improved processability at low temperatures and a wide processing window. The propylene homopolymers according to the current invention are used most advantageously as the core layer of the BOPP film. When used in the manufacture of BOPP films, the propylene homopolymers according to the current invention are non-nucleated.

EXAMPLES

The following examples are provided for illustration and not limitation of the present invention. Ten lots of polypropylene homopolymer for use in producing biaxially oriented films were prepared. The properties of these materials are shown in Table 1. Lots D–J are according to the present invention and lots A–C are comparative examples. While there is some correlation between the average meso sequence length $N_m$ and the content of xylene solubles, the data in Table 1 show that the same level of xylene solubles in two materials does not necessarily result in a similar average meso sequence length, compare samples A and F. Similarly, two samples may display approximately the same average meso sequence length at different levels of xylene solubles, compare samples C and D. As can also be seen, the meso sequence length $N_m$ varies significantly for a given percent meso pentad (mmmm).

TABLE 1

| Property | A | B | C | D | E | F | G | H | I | J |
|---|---|---|---|---|---|---|---|---|---|---|
| % XS | 5.3 | 4.4 | 5.1 | 5.8 | 5.5 | 5.3 | 6.2 | 6.5 | 7.0 | 7.5 |
| mmmm | 95.55 | 96.09 | 95.75 | 95.2 | 95.1 | 93.8 | 95.22 | 95.76 | 95.57 | 95.36 |
| $N_m$ | 168.8 | 194.2 | 125.7 | 126.9 | 116.8 | 104.4 | 119.5 | 116.0 | 129.1 | 122.4 |
| mr + rm | 1.17 | 1.02 | 1.57 | 1.55 | 1.69 | 1.88 | 1.65 | 1.7 | 1.53 | 1.61 |
| $T_m$(° C.) | 160.7 | 164.3 | 163.9 | 159.1 | 162.7 | 162.7 | 162.7 | 161.8 | 161.1 | 162.4 |
| $T_c$(° C.) | 114.7 | 116.3 | 116.0 | 112.6 | 109.4 | 110.2 | 114.9 | 114.5 | 114.9 | 114.9 |
| $X_c$(%) | 55.7 | 55.3 | 53.3 | 53.3 | 55.0 | 52.9 | 51.5 | 51.2 | 52.2 | 50.4 |
| Mn/1000 | 66.5 | 67.7 | 64.6 | 50.4 | 61.9 | 64.5 | 64.1 | 65.3 | 64.1 | 61.0 |
| Mw/1000 | 296 | 307 | 283 | 257 | 325 | 314 | 288 | 306 | 308 | 289 |
| Mz/1000 | 930 | 834 | 809 | 988 | 1112 | 990 | 919 | 929 | 936 | 839 |
| [a]D | 4.5 | 4.53 | 4.38 | 5.1 | 5.3 | 4.8 | 4.49 | 4.69 | 4.81 | 4.74 |
| r | 31.8 | 44.1 | 24.6 | 21.9 | 21.2 | 19.7 | 19.3 | 17.8 | 18.4 | 16.3 |

[a]D = Molecular weight distribution Mw/Mn

All of these lots were tested for stretchability on a T.M. Long film stretcher (T.M. Long Corporation, Somerville, N.J.). The yield stress values for these materials, reported in psi, are shown in Tables 2–4. It is believed that the yield stress results obtained on the T.M. Long film stretcher are an accurate predictor of the performance of a given material on a commercial tenter line. Lower yield stress values at each temperature correspond to better processability on a tenter line. The data are reported based on the groupings of the samples as they were tested. Since there is some evidence that T.M. Long data obtained across different days may not be comparable, the results are only reported comparing data that was collected on the same day.

TABLE 2

| Temperature | B | C | G | H | I | J |
|---|---|---|---|---|---|---|
| 280° C. | 626 | 588 | 523 | 508 | 490 | 492 |
| 290° C. | 472 | 452 | 398 | 372 | 357 | 351 |
| 300° C. | 316 | 273 | 219 | 212 | 204 | 209 |

Comparing the T.M. Long results for comparative samples B–C with the results for samples G–J, according to the current invention, it is clear that there is a significant drop off in the yield stress at each temperature tested when the ratio, r, is less than 22 for materials having a value for $N_m$ of 130 or less. This is particularly apparent comparing sample C with sample I. Even though the meso run length $N_m$ for the xylene insoluble fraction of sample I is higher than for comparative sample C, the yield stress values are significantly lower for sample I.

TABLE 3

| Temperature | D | E | F |
|---|---|---|---|
| 280° C. | 524 | 534 | 528 |
| 290° C. | 365 | 368 | 394 |
| 300° C. | 231 | 225 | 242 |

Samples D–F compare materials having solubles contents ranging from 5.3 to 5.8. As can be seen, all three samples displayed comparable yield stress values on the T.M. Long despite the variation in solubles content and $N_m$. These data also demonstrate that good processability can be obtained with lower solubles content. The comparisons in both Tables 2 and 3 indicate that neither the meso run length $N_m$, nor the content of xylene solubles alone dictates the stretching properties of the material. Rather, it is a balance of the two properties.

TABLE 4

| Temperature | A | D |
|---|---|---|
| 280° C. | 555 | 538 |
| 290° C. | 417 | 410 |
| 300° C. | 245 | 236 |

The data reported in Table 4 compares results for comparative sample A against a retest of sample D. Although the reduction in stress yield at each temperature was not as pronounced in this test as in the other examples, this test still confirms the pattern that yield stress at each temperature is lower for samples meeting the criteria of the current invention.

Three of the lots: A, D and E, were also tested on a commercial tenter line to determine their processing characteristics. The materials were tested by producing single layer films. Processing was observed for the number of web breakages, with a total of more than three web breakages per day constituting unacceptable processing qualities. The materials produced were examined for variations in film thickness. The results of the testing are shown in Table 5.

TABLE 5

| Property | A | D | E |
|---|---|---|---|
| Speed (m/min) | 350 | 340 | 300 |
| Width (m) | 8 | 8 | 8 |
| Film thickness (μm) | 30 | 28/33 | 14.5 |
| Draw ratio (MD × TD) | 5 × 9 | 5 × 9 | 5 × 9–10 |
| Thickness variation | >±3.5% | <±3.0% | — |
| Processability | poor | excellent | very good |
| % XS | 5.3 | 5.8 | 5.5 |
| $N_m$ | 168.8 | 126.9 | 116.8 |
| r | 31.8 | 21.9 | 21.2 |

The comparative sample A material exhibited unacceptable thickness variations while the material of sample D had excellent processability. The major difference between the two materials was the amounts of xylene solubles (XS) and $N_m$ values. In addition, the comparative example A material exhibited a relatively narrow processing window. As given in Table 5, the material of sample E has slightly lower amounts of xylene solubles than the material of sample D, but it exhibited a comparable performance on the commercial line.

The results shown in Table 5 confirm that materials having the proper balance of $N_m$ and xylene soluble content perform well on a tenter line. These results also verify that the T.M. Long yield stress data are a predictor of performance on a tenter line.

It should be noted that additives can be added to the propylene homopolymers of the current invention as is conventional in the art. Additives which may be useful in conjunction with the current invention include, but are not limited to, phenolic antioxidants, phosphites, phosphonites, hindered amine light stabilizers, hydroxylamines and acid scavengers. However, the inventor does not contemplate the use of nucleating agents as being within the scope of the current invention.

The propylene homopolymers according to the current invention can be used in single layer BOPP films or as the core layer in a multilayer BOPP film. The propylene homopolymers according to the current invention will be useful in producing various types of BOPP films including: clear, opaque, metallized and coated films. Such films find use in a variety of areas including, but not limited to: laminating substrate for packaging, capacitors, shrink film, labels, tape, moisture, chemical and light barriers, and sheet protectors.

What is claimed is:

1. An improved method for producing a multilayer biaxially oriented film, the improvement comprising:
   providing as a core layer a propylene homopolymer having a xylene insoluble fraction and a xylene soluble fraction;
   said xylene insoluble fraction having a meso run length of less than or equal to 130;
   with the proviso that the ratio, r, of the meso run length of the xylene insoluble fraction to the percent content of the xylene soluble fraction in said polypropylene homopolymer is 22 or less, as determined by the equation:

$$N_m / \% \ XS = r$$

where: $N_m$ = meso run length of said xylene insoluble fraction; and
   % XS = the percent content of said xylene soluble fraction in said polypropylene homopolymer.

2. The method according to claim 1, wherein:
   said xylene insoluble fraction comprises about 97 to about 91 percent by weight of said propylene homopolymer, and said xylene soluble fraction comprises about 9 to about 3 percent by weight of said propylene homopolymer.

3. The method according to claim 2, wherein said propylene homopolymer has a melt flow rate of about 2 to about 4 dg/min.

4. The method according to claim 1, wherein:
   said xylene insoluble fraction comprises about 96 to about 93 percent by weight of said propylene homopolymer, and said xylene soluble fraction comprises about 7 to about 4 percent by weight of said propylene homopolymer.

5. The method according to claim 1, further comprising, adding to said propylene homopolymer at least one additive selected from the group consisting of: phenolic antioxidants, phosphites, phosphonites, hindered amine light stabilizers, hydroxyl amines and acid scavengers.

6. A method for consistently providing a propylene homopolymer displaying a broad processing window and a wide range of processing temperatures as core material in the manufacture of a biaxially oriented film, said method comprising:

polymerizing propylene in the presence of a polymerization catalyst such that the propylene homopolymer produced comprises about 91 to about 97 percent by weight of a xylene insoluble fraction having a meso run length of 130 or less, and about 3 to about 9 percent by weight of a xylene soluble fraction, wherein the ratio, r, of the meso run length of the xylene insoluble fraction to the percent content of the xylene soluble fraction in said polypropylene homopolymer is 22 or less, as determined by the equation:

$$N_m / \% XS = r$$

where: $N_m$=meso run length of said xylene insoluble fraction; and

% XS=the percent content of said xylene soluble fraction in said propylene homopolymer.

7. The method according to claim 6, wherein said polymerization is controlled such that said propylene homopolymer produced comprises about 93 to about 96 percent by weight of a xylene insoluble fraction having a meso run length of 130 or less.

8. The method according to claim 6, further comprising the step of adding to said propylene homopolymer at least one additive selected from the group consisting of: phenolic antioxidants, phosphites, phosphonites, hindered amine light stabilizers, hydroxyl amines and acid scavengers.

9. The method according to claim 6, further comprising;

polymerizing said propylene such that the propylene homopolymer produced has a melt flow rate of about 2 to about 4 dg/min.

* * * * *